(12) United States Patent
Murakami et al.

(10) Patent No.: US 10,202,493 B2
(45) Date of Patent: Feb. 12, 2019

(54) POLYAMIDE-IMIDE RESIN, AND CURABLE RESIN COMPOSITION AND CURED PRODUCT OF SAME

(71) Applicant: DIC Corporation, Tokyo (JP)

(72) Inventors: Kouichi Murakami, Ichihara (JP); Atsushi Miyagaki, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/905,388

(22) PCT Filed: Jul. 15, 2014

(86) PCT No.: PCT/JP2014/068774
§ 371 (c)(1),
(2) Date: Jan. 15, 2016

(87) PCT Pub. No.: WO2015/008744
PCT Pub. Date: Jan. 22, 2015

(65) Prior Publication Data
US 2016/0152773 A1    Jun. 2, 2016

(30) Foreign Application Priority Data

Jul. 18, 2013   (JP) .................................. 2013-149409

(51) Int. Cl.
| | | |
|---|---|---|
| *C08G 73/14* | (2006.01) | |
| *C08L 63/00* | (2006.01) | |
| *C08L 79/08* | (2006.01) | |
| *C08G 73/10* | (2006.01) | |

(52) U.S. Cl.
CPC .......... *C08G 73/14* (2013.01); *C08G 73/1035* (2013.01); *C08L 63/00* (2013.01); *C08L 79/08* (2013.01)

(58) Field of Classification Search
CPC ..... C08G 73/14; C08G 73/1035; C08L 63/00; C08L 79/08
See application file for complete search history.

(56) References Cited

U.S. PATENT DOCUMENTS 6,784,275 B2 * 8/2004 Ichinose ............ C08G 73/1035
430/170

FOREIGN PATENT DOCUMENTS

| EP | 1270644 A1 | 1/2003 |
| JP | 59-64633 A | 4/1984 |
| JP | 61-2735 A | 1/1986 |
| JP | 62-0184016 A * | 8/1987 |
| JP | 2000-344889 A | 12/2000 |
| JP | 2001-316469 A | 11/2001 |
| TW | 201037001 A * | 10/2010 |
| WO | WO-2010/107045 A1 | 9/2010 |

OTHER PUBLICATIONS

International Search Report dated Aug. 12, 2014, issue for PCT/JP2014/068774.
Extended European Search Report, issued in corresponding European Patent Application No. EP 14826521.8, dated Feb. 17, 2017.

* cited by examiner

*Primary Examiner* — Sanza L. McClendon
(74) *Attorney, Agent, or Firm* — Locke Lord LLP; James E. Armstrong, IV; Nicholas J. DiCeglie, Jr.

(57) ABSTRACT

Provided are a thermosetting resin composition which is soluble in a general-purpose solvent and which can obtain a cured product (cured film) having high optical transparency to the ultraviolet region (approximately 300 nm) from the visible region, and a polyamide-imide resin suitable for use in preparing the thermosetting resin composition. Specifically, provided are an alcohol-modified polyamide-imide resin, which is obtained by reacting an isocyanurate type polyisocyanate (a1) synthesized from an isocyanate having an aliphatic structure with a tricarboxylic anhydride (a2) to prepare a polyamide-imide resin (a), and then reacting the polyamide-imide resin (a) with an alcohol compound (b); a curable resin composition containing the polyamide-imide resin; and a cured product of the curable resin composition.

19 Claims, No Drawings

POLYAMIDE-IMIDE RESIN, AND CURABLE RESIN COMPOSITION AND CURED PRODUCT OF SAME

TECHNICAL FIELD

The present invention relates to a polyamide-imide resin, and a curable resin composition containing the polyamide-imide resin and a cured product thereof. More particularly, the present invention relates to a polyamide-imide resin, which can be appropriately used in fields requiring transparency in addition to heat resistance, for example, fields for optical materials, fields for solder resist materials of printed wiring boards, protective materials and insulating materials of household appliances, such as refrigerators and rice cookers, and protective materials, insulating materials, adhesives, and reflective materials used in liquid crystal displays and liquid crystal display elements, organic and inorganic electroluminescence displays and organic and inorganic electroluminescence elements, LED displays, light-emitting diodes, electronic papers, solar batteries, TSV, optical fibers, optical waveguides, and the like, and fields for display devices, such as liquid crystal alignment films, protective films for color filters, and the like, and a curable resin composition containing the polyamide-imide resin and a cured product thereof.

BACKGROUND ART

A polyamide-imide resin is excellent in heat resistance and mechanical properties, and has been used in various fields mainly in electric and electronic industries. However, in recent years, for the purpose of reducing the burden on the environment, the dissolving performance in a general-purpose solvent, such as diethylene glycol monoethyl ether acetate (EDGA) has been required. In addition, in view of heat resistance and mechanical properties, a polyamide-imide resin is expected to be used in the fields where transparency of the cured products, such as a liquid crystal display and an LED display, is required. In these fields, optical transparency from visible to ultraviolet range (approximately 300 nm) is required.

As the polyamide-imide resin dissolving in a general-purpose solvent, for example, a polyamide-imide resin obtained by reacting an isocyanurate type polyisocyanate (a1) of an isocyanate having an aliphatic structure with a trimellitic anhydride is disclosed (for example, refer to PTL 1). However, a cured product obtained by using the poly-amide-imide resin disclosed in PTL 1 has insufficient transparency. For example, in the measurement of light transmittance, the optical transparency of the cured product in an ultraviolet range (approximately 300 nm) is not sufficient.

Meanwhile, it is known that a polyamide-imide resin obtained by reacting an isocyanurate type polyisocyanate (a1) synthesized from an isocyanate having an aliphatic structure with a tricarboxylic anhydride (a2) having an aliphatic structure is combined with a curable resin while maintaining the solubility in a general-purpose solvent, and further cured, so as to provide a cured product (cured film) having excellent transparency (refer to PTL 2). However, a curable resin composition obtaining by combining the polyamide-imide resin with a curable resin or a reaction diluent tends to have insufficient storage stability and short usable life and to have insufficient treatability.

CITATION LIST

Patent Literature

[PTL 1] JP-A-2001-316469
[PTL 2] WO2010-107045 Pamphlet

SUMMARY OF INVENTION

Technical Problem

An object of the present invention is to provide a curable resin composition, which contains a polyamide-imide resin soluble in a general-purpose solvent, has excellent storage stability and long usable life even when combined with a curable resin, and can manufacture a cured product (cured film) having excellent transparency, and a cured product thereof.

Solution to Problem

The present inventors have conducted intensive studies. As a result, they have found that, when the acid anhydride group of the end group of the polyamide-imide resin obtained by reacting an isocyanurate type polyisocyanate (a1) synthesized from an isocyanate having an aliphatic structure with a tricarboxylic anhydride (a2) is modified by an alcohol compound, the polyamide-imide resin becomes soluble in a general-purpose solvent, a resin composition containing the polyamide-imide resin has excellent storage stability and long usable life even when combined with a curable resin, and a cured product obtained by curing the resin composition is excellent in heat resistance and transparency. Based on these findings, the present invention has been completed.

That is, the present invention relates to an alcohol-modified polyamide-imide resin obtained by reacting an isocyanurate type polyisocyanate (a1) synthesized from an isocyanate having an aliphatic structure with a tricarboxylic anhydride (a2) to prepare a polyamide-imide resin (a), and then reacting the polyamide-imide resin (a) with an alcohol compound (b).

Further, the present invention relates to a curable resin composition containing the alcohol-modified polyamide-imide resin (A) and a curable resin (B).

Furthermore, the present invention relates to a cured product prepared by curing the curable resin composition.

Advantageous Effects of Invention

According to the present invention, it is possible to provide a curable resin composition, which contains a polyamide-imide resin soluble in a general-purpose solvent, has excellent storage stability and long usable life even when combined with a curable resin, and can manufacture a cured product (cured film) having excellent transparency, and a cured product thereof.

DESCRIPTION OF EMBODIMENTS

The alcohol-modified polyamide-imide resin (A2) of the present invention is obtained by reacting an isocyanurate type polyisocyanate (a1) synthesized from an isocyanate having an aliphatic structure with a tricarboxylic anhydride (a2) to prepare a polyamide-imide resin (A1), and then reacting the polyamide-imide resin (A1) with an alcohol compound (b).

Examples of the isocyanurate type polyisocyanate (a1) synthesized from an isocyanate having an aliphatic structure include an isocyanurate type polyisocyanate synthesized from an isocyanate having a linear aliphatic structure and an isocyanurate type polyisocyanate synthesized from an isocyanate having a cyclic aliphatic structure.

Examples of the isocyanurate type polyisocyanate synthesized from an isocyanate having a linear aliphatic structure include HDI3N (isocyanurate type triisocyanate synthesized from hexamethylene diisocyanate (contains a polymer, such as a pentamer)) and HTMDI3N (isocyanurate type triisocyanate synthesized from trimethylhexamethylene diisocyanate (contains a polymer, such as a pentamer)). They may be used alone or in a combination thereof.

Examples of the isocyanurate type polyisocyanate synthesized from an isocyanate having a cyclic aliphatic structure include IPDI3N (isocyanurate type triisocyanate synthesized from isophorone diisocyanate (contains a polymer, such as a pentamer)), HTDI3N (isocyanurate type triisocyanate synthesized from hydrogenated tolylene diisocyanate (contains a polymer, such as a pentamer)), HXDI3N (isocyanurate type triisocyanate synthesized from hydrogenated xylene diisocyanate (contains a polymer, such as a pentamer)), NBDI3N (isocyanurate type triisocyanate synthesized from norbornane diisocyanate (contains a polymer, such as a pentamer)), and HMDI3N (isocyanurate type triisocyanate synthesized from hydrogenated diphenylmethane diisocyanate (contains a polymer, such as a pentamer)).

As the isocyanurate type polyisocyanate (a1) synthesized from an isocyanate having an aliphatic structure, used in the present invention, particularly in view of obtaining a cured film having high Tg and excellent thermal properties, an isocyanurate type polyisocyanate synthesized from isocyanate having a cyclic aliphatic structure is preferable, and, among them, an isocyanurate type triisocyanate synthesized from isophorone diisocyanate is preferable. Meanwhile, the isocyanurate type triisocyanate synthesized from isophorone diisocyanate may contain a polymer, such as a pentamer.

The content rate of the isocyanurate type polyisocyanate synthesized from an isocyanate having a cyclic aliphatic structure in the isocyanurate type polyisocyanate (a1) synthesized from an isocyanate having an aliphatic structure is 50 mass % to 80 mass % based on mass of the component (a1), but, in view of obtaining a cured film having high Tg and excellent thermal properties, is more preferably 80 mass % to 100 mass %, and most preferably 100 mass %.

Adducts obtained by the urethanization reaction of the above isocyanate compound with various polyols can also be used within a range that does not deteriorate the solvent solubility of the polyamide-imide resin of the present invention.

In the polyamide-imide resin (A1) containing a carboxyl group, used in the present invention, an imide bond is directly formed from the aforementioned isocyanate compound (a1) and tricarboxylic anhydride (a2), thereby synthesizing a polyamide-imide resin having good reproducibility, good solubility and excellent transparency without going through a polyamic acid intermediate having a problem in stability or the like.

In the present invention, the transparency of the polyamide-imide resin obtained by using the tricarboxylic anhydride (a2) as the raw material of polyamide-imide is improved. Examples of the tricarboxylic anhydride include a tricarboxylic anhydride having an aromatic structure in a molecule thereof and a tricarboxylic anhydride having an aliphatic structure in a molecule thereof. Among these, a tricarboxylic anhydride having an aliphatic structure in a molecule thereof is preferable because it makes the storage stability of a curable resin composition excellent and makes the usable life thereof long and it tends to be excellent in the thermal decomposition temperature of a cured product.

Examples of the tricarboxylic anhydride having an aliphatic structure in a molecule thereof include trimellitic anhydride and naphthalene-1,2,4-tricarboxylic anhydride. Examples of the tricarboxylic anhydride having an aliphatic structure include a tricarboxylic anhydride having a linear aliphatic structure and a tricarboxylic anhydride having a cyclic aliphatic structure. An example of the tricarboxylic anhydride having a linear aliphatic structure includes propanetricarboxylic anhydride. Examples of the tricarboxylic anhydride having a cyclic aliphatic structure include cyclohexane tricarboxylic anhydride, methylcyclohexane tricarboxylic anhydride, cyclohexene tricarboxylic anhydride, and methylcyclohexene tricarboxylic anhydride.

Among the tricarboxylic anhydrides having an aliphatic structure, used in the present invention, in view of obtaining a cured film having excellent thermal properties, such as high Tg, in addition to transparency, a tricarboxylic anhydride having a cyclic aliphatic structure is preferable. Further, it is preferable that the isocyanurate type polyisocyanate compound (a1) is an isocyanurate type polyisocyanate synthesized from isocyanate having a cyclic aliphatic structure, and the tricarboxylic anhydride (a2) is a tricarboxylic anhydride having a cyclic aliphatic structure. Examples of the tricarboxylic anhydride having a cyclic aliphatic structure include cyclohexane tricarboxylic anhydrides. They can be used along or in combination of two or more kinds. If necessary, it is also possible to use bifunctional dicarboxylic acid compounds, for example, adipic acid, sebacic acid, phthalic acid, fumaric acid, maleic acid, and acid anhydrides thereof.

Examples of the cyclohexane tricarboxylic anhydride include cyclohexane-1,3,4-tricarboxylic acid-3,4-anhydride, cyclohexane-1,3,5-tricarboxylic acid-3,5-anhydride, and cyclohexane-1,2,3-tricarboxylic acid 2,3-anhydride. Among them, cyclohexane-1,3,4-tricarboxylic acid-3,4-anhydride is preferable in view of making a polyamide-imide resin having excellent solvent solubility in addition to transparency and obtaining a cured film having high Tg and excellent thermal properties.

Here, the aforementioned cyclohexane tricarboxylic anhydride has a structure represented by the following General Formula (1). In this case, impurities, such as cyclohexane-1,2,3-tricarboxylic acid and cyclohexane-1,3,4-tricarboxylic acid, which are used as raw materials for producing, may be mixed in a range not to deteriorate the effects of the present invention, for example, in a range of 10 mass % or less, and preferably 5 mass % or less.

[Chem. 1]

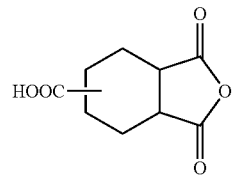

(1)

When a carboxylic acid component of the tricarboxylic anhydride (a2) reacts with an isocyanate component of the polyisocyanate (a1), imide and amide are formed, and the resin of the present invention is made into an amide-imide resin. Further, at the time of reacting the polyisocyanate (a1) with the tricarboxylic anhydride (a2), when the tricarboxylic anhydride (a2) reacts with the polyisocyanate (a1) in a proportion which leaves the carboxylic acid component of the tricarboxylic anhydride (a2), the obtained polyamide-imide resin has a carboxylic group. This carboxylic group reacts with the polymerizable group, such as epoxy group, of an epoxy resin contained in the following curable resin composition of the present invention to form a crosslinked structure of a cured product. Meanwhile, since reaction rate is high due to rapid imidization, even in the reaction of tricarboxylic acid and triisocyanate, tricarboxylic acid selectively forms an imide at an anhydrous acid.

When the polyamide-imide resin (A1) used in the present invention is obtained by reacting the isocyanurate type polyisocyanate (a1) synthesized from an isocyanate having an aliphatic structure with the tricarboxylic anhydride (a2), preferably, the reaction is performed in a polar solvent that does not contain any of nitrogen atoms and sulfur atoms. When a polar solvent containing nitrogen atoms or sulfur atoms exists, environmental problems are likely to occur, and the growth of molecules can be easily prevented in the reaction of the isocyanurate type polyisocyanate (a1) with the tricarboxylic anhydride (a2). Due to the cleavage of molecules, the physical properties of the composition easily deteriorate, and coating defects, such as "flecks" and the like, are likely to occur.

In the present invention, the polar solvent that does not contain any of nitrogen atoms and sulfur atoms is preferably an aprotic solvent. For example, although a cresol-based solvent is a phenolic solvent having protons, the cresol-based solvent is rather not preferable in view of the environment, and easily inhibits the growth of molecules by reacting with an isocyanate compound. Further, the cresol-based solvent is easily made into a blocking agent by reacting with isocyanate groups. Therefore, it is difficult to obtain good physical properties by reacting with other curing components (for example, epoxy resin) upon curing. Further, when the blocking agent is taken out, it is easy to contaminate equipment used and other materials. Meanwhile, an alcohol-based solvent is not preferable because it reacts with an isocyanate or an acid anhydride. Examples of the aprotic solvent include ether-based solvents having no hydroxyl group, ester-based solvents having no hydroxyl group, and ketone-based solvents having no hydroxyl group. Examples of the ester-based solvents having no hydroxyl group include ethyl acetate, propyl acetate, and butyl acetate. Examples of the ketone-based solvents having no hydroxyl group include acetone, methyl ethyl ketone, methyl isobutyl ketone, and cyclohexanone. Among these, the ether-based solvents having no hydroxyl group are particularly preferable.

In the present invention, the ether-based solvent having no hydroxyl group has weak polarity, and provides an excellent reaction field in the aforementioned reaction of the isocyanurate type polyisocyanate (a1) of the isocyanate having an aliphatic structure with the tricarboxylic anhydride (a2). As the ether-based solvent, commonly known ether-based solvents can be used. Examples of the ether-based solvent include ethylene glycol dialkyl ethers, such as ethylene glycol dimethyl ether, ethylene glycol diethyl ether, and ethylene glycol dibutyl ether; polyethylene glycol dialkyl ethers, such as diethylene glycol dimethyl ether, diethylene glycol diethyl ether, diethylene glycol dibutyl ether, triethylene glycol dimethyl ether, triethylene glycol diethyl ether, and triethylene glycol dibutyl ether; ethylene glycol mono alkyl ether acetates, such as ethylene glycol monomethyl ether acetate, ethylene glycol monoethyl ether acetate, and ethylene glycol monobutyl ether acetate; polyethylene glycol mono alkyl ether acetates, such as diethylene glycol monomethyl ether acetate, diethylene glycol monoethyl ether acetate, diethylene glycol monobutyl ether acetate, triethylene glycol monomethyl ether acetate, triethylene glycol monoethyl ether acetate, and triethylene glycol monobutyl ether acetate; propylene glycol dialkyl ethers, such as propylene glycol dimethyl ether, propylene glycol diethyl ether, and propylene glycol dibutyl ether; polypropylene glycol dialkyl ethers, such as dipropylene glycol dimethyl ether, dipropylene glycol diethyl ether, dipropylene glycol dibutyl ether, tripropylene glycol dimethyl ether, tripropylene glycol diethyl ether, and tripropylene glycol dibutyl ether; propylene glycol monoalkyl ether acetates, such as propylene glycol monomethyl ether acetate, propylene glycol monoethyl ether acetates, and propylene glycol monobutyl ether acetate; polypropylene glycol monoalkyl ether acetates, such as dipropylene glycol monomethyl ether acetate, dipropylene glycol monoethyl ether acetate, dipropylene glycol monobutyl ether acetate, tripropylene glycol monomethyl ether acetate, tripropylene glycol monoethyl ether acetate, and tripropylene glycol monobutyl ether acetate; dialkyl ethers and monoacetate monoalkyl ethers of copolymer polyether glycols, such as low molecular ethylene-propylene copolymers; alkyl esters of these polyether glycols; and monoalkyl ester monoalkyl ethers of polyether glycols.

When the isocyanurate type polyisocyanate (a1) synthesized from an isocyanate having an aliphatic structure reacts with the tricarboxylic anhydride (a2) such that the ratio $[((M1)+(M2))/(N)]$ of sum of the mole number (M1) of carboxyl groups and the mole number (M2) of acid anhydride groups of the tricarboxylic anhydride (a2) to the mole number (N) of isocyanate groups of the isocyanurate type polyisocyanate (a1) synthesized from an isocyanate having an aliphatic structure is 1.1 to 3, the polarity in the reaction system increases to allow the reaction to smoothly proceed, an isocyanate group does not remain, and the stability of the obtained polyamide-imide resin becomes good. The low remained amount of the tricarboxylic anhydride (a2) is also more preferable because it is difficult to cause a problem of separation, such as recrystallization. The ratio thereof is more preferably 1.2 to 2. Meanwhile, in the present invention, the acid anhydride group refers to the —CO—O—CO— group obtained by the intramolecular dehydration condensation of two molecules of carboxylic acid.

The imidization reaction is preferably performed by mixing one or more isocyanate compounds (a1) and one or more tricarboxylic anhydrides (a2) in a solvent or without solvent and then increasing temperature while stirring the mixture. The reaction temperature is preferably in a range of 50° C. to 250° C., and particularly preferably in a range of 70° C. to 180° C. By such a reaction temperature, the reaction rate is faster, and there is an effect that it is difficult to cause side reactions and decomposition. In the reaction, a hydroxyl-free group and an isocyanate group form an imide group while being accompanied by decarboxylation. The progress of the reaction can be traced by an infrared spectrum, acid value, or quantitative analysis means of an isocyanate group or the like. In the infrared spectrum, an absorption at 2270 $cm^{-1}$, which is characteristic absorption of an isocyanate group, decreases with the reaction, and an acid anhydride group having a characteristic absorption at 1860 $cm^{-1}$ and 850 $cm^{-1}$ also decreases. Meanwhile, the absorption of an imide group increases at 1780 $cm^{-1}$ and 1720 $cm^{-1}$. The reaction may be completed after lowering the temperature while checking target acid value, viscosity, molecular weight or the like. However, in terms of temporal stability, more preferably, the reaction continues until the isocyanate group disappears. Further, during the reaction or after the reaction, a catalyst, an antioxidant, a surfactant, or other additives may be added within a range that does not deteriorate the physical properties of a resin to be synthesized.

As an example of the polyamide-imide resin (A1) used in the present invention, an imide resin represented by (Formula 2) below is exemplified.

[Chem. 2]

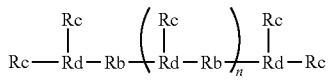
(Formula 2)

n is a repeating unit of 0 to 30. Rb, for example, is a structural unit represented by Structural (Formula 3) or (Formula 4) below.

[Chem. 3]

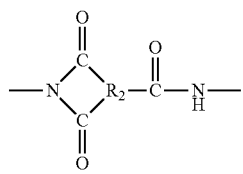
(Formula 3)

[Chem. 4]

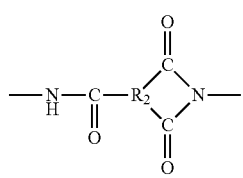
(Formula 4)

($R_2$, for example, is an aromatic or aliphatic tricarboxylic acid residue which may have a substituent of 6 to 20 carbon atoms.) Rc, for example, is a structural unit represented by Structural (Formula 5).

[Chem. 5]

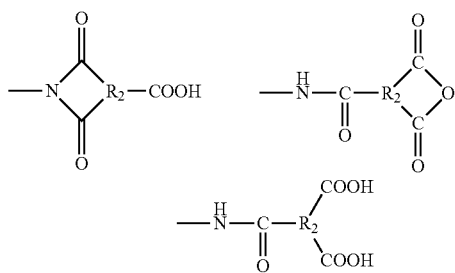
(Formula 5)

($R_2$, for example, is the same as above.)

Rd, for example, is a trivalent organic group represented by Structural (Formula 6) below.

[Chem. 6]

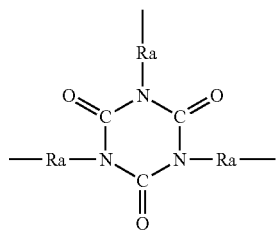
(Formula 6)

Ra, for example, represents a residue of divalent aliphatic diisocyanates.

The alcohol-modified polyamide-imide resin (A2) of the present invention is obtained by preparing a polyamide-imide resin (A1) using the aforementioned method and then reacting the polyamide-imide resin (A1) with an alcohol compound (a3). The reaction of the polyamide-imide resin (A1) with the alcohol compound (a3) is not particularly limited as long as it is within a range that does not deteriorate the effects of the present invention. For example, this reaction can be performed by the following esterification reaction.

The polyamide-imide resin (A1), which is used as a raw material, can be prepared by the above method. However, since the polyamide-imide resin (A1) can suppress the side reaction of urethanization at the time of reacting with the alcohol compound (a3), this polyamide-imide resin (A1) is preferably a polyamide-imide resin in which an isocyanate group completely disappears. The disappearance of an isocyanate group can be confirmed by the disappearance of 2270 $cm^{-1}$, which is characteristic absorption of the isocyanate group, in the infrared spectrum.

In the reaction of the polyamide-imide resin (A1) with the alcohol compound (a3), the ratio of the mole number (M3) of acid anhydride groups in the polyamide-imide resin (A1) to the mole number (L) of hydroxyl groups in the alcohol compound (a3) is in a range of L/M=1 to 5. The ratio (L/M3) in a range of 1 to 5 is preferable in terms of improving the storage stability of the obtained polyamide-imide resin, and the ratio (L/M3) in a range of 1 to 2 is more preferable from the viewpoint of reducing the excess alcohol.

Meanwhile, the mole number (M3) of acid anhydride groups in the polyamide-imide resin (A1) can be determined by the following method because the tricarboxylic anhydride (a2) is consumed by the reaction with the polyisocyanate (a1).

(1) The polyamide-imide resin (A1) is diluted with a solvent or the like, and acid value (a) is obtained by the titration of an aqueous KOH solution.

(2) The polyamide-imide resin (A1) is diluted with a solvent or the like, an excess amount of n-butanol reacts with an acid anhydride group, and then acid value (b) is obtained by the titration of an aqueous KOH solution. In (2), the reaction of an acid anhydride group with n-butanol is performed at 117° C. The disappearance of acid anhydride is confirmed by the complete disappearance of 1860 $cm^{-1}$, which is characteristic absorption of the acid anhydride group, in the infrared spectrum.

(3) The concentration of the acid anhydride group in the polyamide-imide resin (A1) of the present invention is calculated by the difference between the acid value (a) and the acid value (b), and the calculated concentration is converted to the mole number (M3).

Examples of the alcohol compound (a3) include: alcohols having 10 carbon atoms or less, such as methyl alcohol, ethyl alcohol, n-propyl alcohol, isopropyl alcohol, n-butyl alcohol, isobutyl alcohol, t-butyl alcohol, ethylene glycol, propylene glycol, trimethylolpropane, and benzyl alcohol; ether bond-containing alcohols having 10 carbon atoms or less, such as 2-methoxyethyl alcohol, 2-ethoxyethyl alcohol, 1-methoxy-2-propyl alcohol, 1-ethoxy-2-propyl alcohol, 3-methoxy-1-butyl alcohol, and 2-isopropoxyethyl alcohol; ketone group-containing alcohols having 10 carbon atoms or less, such as 3-hydroxy-2-butanone; and ester group-containing alcohols having 10 carbon atoms or less, such as hydroxy methyl isobutyrate. In the present invention, monohydric alcohols having 10 carbon atoms or less are used, but are preferable in terms of physical properties of the obtained thermosetting resin. Further, monohydric alcohols having 5 carbon atoms or less are preferable.

The dehydration esterification reaction is preferably performed by mixing a polyamide-imide resin (A1) and one or more alcohol compounds (a3) in a solvent or without solvent and then increasing temperature while stirring the mixture. The reaction temperature is preferably in a range of 50° C. to 150° C., and particularly preferably in a range of 70° C. to 130° C. By such a reaction temperature, the reaction rate is faster, and there is an effect that it is difficult to cause side reactions and decomposition. In the reaction, an ester bond is formed while being accompanied by a dehydration reaction. The progress of the reaction can be traced by an infrared spectrum, acid value, or quantitative analysis means of an ester bond. In the infrared spectrum, absorptions at 1860 cm$^{-1}$ and 850 cm$^{-1}$, which are characteristic absorption of an acid anhydride group, decrease with the reaction. The reaction may be completed after lowering the temperature while checking target acid value, viscosity, molecular weight or the like. However, in terms of temporal stability, more preferably, the reaction continues until the acid anhydride group disappears.

The solvent used in the dehydration esterification reaction may be the same as the solvent used in the imidization reaction. Further, during the reaction or after the reaction, a catalyst, an antioxidant, a surfactant, or other additives may be added within a range that does not deteriorate the physical properties of a resin to be synthesized.

The acid value of the alcohol-modified polyamide-imide resin (A2) of the present invention is preferably from 70 to 210 KOHmg/g, and particularly preferably from 90 to 190 KOHmg/g. When the acid value thereof is from 70 to 210 KOHmg/g, excellent performance in curing properties is exhibited.

Further, the alcohol-modified polyamide-imide resin (A2) of the present invention is preferably a polyamide-imide resin dissolving in the polar solvent that contains neither of nitrogen atoms nor sulfur atoms. An example of such a polyamide-imide resin includes a branched polyamide-imide resin having a branched structure and having an acid value of 60 KOHmg/g or more.

The number average molecular weight of the alcohol-modified polyamide-imide resin (A2) of the present invention is preferably 1,000 to 20,000, and more preferably 2,000 to 8,000 in that solvent solubility is good, and a cured product having excellent mechanical strength is obtained. The molecular weight thereof can be measured by gel permeation chromatography (GPC) or quantitative analysis of the content of functional groups at terminals.

In the present invention, the measurement of number average molecular weight is performed using GPC according to the following conditions.

Measuring device: HLC-8120GPC, UV8020, manufactured by TOSCH CORPORATION
Column: TFK guard column hxl-L, TFK gel (G1000HXL, G2000HXL, G3000HXL, G4000HXL), manufactured by TOSCH CORPORATION
Detector: RI (differential refractometer) and UV (254 nm)
Measurement conditions: column temperature 40° C.
  solvent THF
  flux 1.0 ml/min
Standard: calibration curve created by polystyrene standard sample
Sample: sample obtained by filtering a THF solution (resin solid content: 0.1 mass %) with a microfilter (injection amount: 200 μl)

As an example of the alcohol-modified polyamide-imide resin (A2) used in the present invention, an imide resin represented by (Formula 7) below is exemplified.

[Chem. 7]

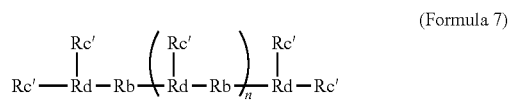

(Formula 7)

n is a repeating unit of 0 to 30. Ra, for example, represents residue of divalent aliphatic isocyanates. Further, Rb, for example, is a structural unit represented by Structural (Formula 3) or (Formula 4) above. Rd, for example, is a trivalent organic group represented by Structural (Formula 6) above, and Rc', for example, is a structural unit represented by Structural (Formula 8) below.

[Chem. 8]

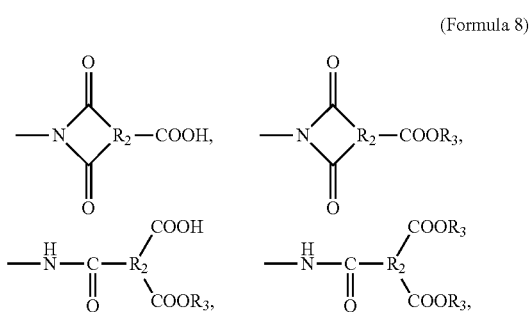

(Formula 8)

(In the formula R$_2$, for example, is the same as above. R$_3$ represents residue obtained by removing a hydroxyl group from an alcohol compound.)

The curable resin composition of the present invention includes the alcohol-modified polyamide-imide resin (A2) of the present invention, and a curable resin (B) and/or a reactive diluent (C).

Examples of the curable resin (B) include an epoxy compound (B1) having two or more epoxy groups in a molecule thereof, a compound having two or more maleimide groups in a molecule thereof, a benzoxazine resin, and a cyanate ester resin. As the (B1) component, commonly known epoxy resins can be used, and these epoxy resins may be used in a mixture of two or more. Other examples of the curable resin (B) include melamine resins, isocyanate compounds, silicates, alkoxy silane compounds, and (meth) acrylic resins. In terms of obtaining a cured product, such as a cured film, having excellent heat resistance, dimensional stability, and mechanical properties (toughness, flexibility), epoxy resins are preferable.

Here, the above or below curing properties of a cured product described in the present invention mean that the cured product of the present invention includes solvent-dried films or molded products containing only the polyamide-imide resin of the present invention or containing the polyamide-imide resin and other resins, additives or inorganic material components not reacting with the polyamide-imide resin, in addition to the cured products of the polyamide-imide resin of the present invention and the components reacting with the polyamide-imide resin. Further, it means that the cure product of the present invention includes cured products obtained by mixing the polyamide-imide resin of the present invention with a curing agent reacted by heating or light and/or obtained by curing the polyamide-imide resin of the present invention with additive components not reacting with this polyamide-imide resin using heat or light.

Examples of the epoxy resin (B1) include bisphenol A type epoxy resin, bisphenol S type epoxy resin, bisphenol F type epoxy resin, phenol novolak type epoxy resin, cresol novolak type epoxy resin, epoxidized products of various dicyclopentadiene-modified phenol resins obtained by reacting dicyclopentadiene with various phenols, epoxidized products of 2,2',6,6'-tetramethyl-biphenol, epoxidized products of 4,4'-methylene bis(2,6-dimethyl phenol), epoxy resins derived from a naphthalene skeleton, such as novolak modification of naphthol and binaphthol or naphthol or binaphthol, and aromatic epoxy resins, such as epoxy resins obtained by epoxidizing phenol resins of a fluorene skeleton.

In addition, aliphatic epoxy resins, such as neopentyl glycol diglycidyl ether and 1,6-hexanediol diglycidyl ether, hydrogenated bisphenol A type epoxy resins, hydrogenated bisphenol F type epoxy resins, cyclic aliphatic epoxy resins, such as 1,2-epoxy-4-(2-oxiranyl) cyclohexane adducts of 3,4-epoxycyclohexylmethyl-3,4-epoxycyclohexane carboxylate, bis-(3,4-epoxy-bicyclohexyl) adipate, and 2,2-bis (hydroxymethyl)-1-butanol, epoxy resins containing polyalkylene glycol chain in the main chain thereof, such as polyethylene glycol diglycidyl ether and polypropylene glycol diglycidyl ether, and hetero ring-containing epoxy resins, such as triglycidyl isocyanurate, can also be used.

In addition, epoxy group-containing polymer resins, which are obtained by polymerizing unsaturated groups, such as a (meth)acryloyl group and a vinyl group, of an epoxy compound having a polymerizable unsaturated double bond, and other copolymers of monomers having polymerizable unsaturated bonds can also be used.

Examples of the compound having both a (meth)acryloyl group and an epoxy group include glycidyl (meth)acrylate, 2-hydroxyethyl (meth)acrylate glycidyl ether, hydroxypropyl (meth)acrylate glycidyl ether, 4-hydroxydibutyl (meth) acrylate glycidyl ether, 6-hydroxyhexyl (meth)acrylate glycidyl ether, 5-hydroxy-3-methylpentyl (meth)acrylate glycidyl ether, (meth)acrylic acid-3,4-epoxycyclohexyl, lactone-modified (meth)acrylic acid-3,4-epoxycyclohexyl, and vinyl cyclohexene oxide.

In the present invention, the epoxy resin (B1) component having two or more epoxy groups in the molecule thereof is particularly preferably a cyclic aliphatic epoxy resin. When the epoxy resin (B1) component is a cyclic aliphatic epoxy resin, a cured film having high Tg and excellent thermal properties can be obtained, and a cured product having high optical transparency in the ultraviolet range (approximately 300 nm) can be obtained. Among the cyclic aliphatic epoxy resins, hydrogenated bisphenol A type epoxy resins and 1,2-epoxy-4-(2-oxiranyl) cyclohexane adducts of 2,2-bis (hydroxymethyl)-1-butanol are preferable.

Such cyclic aliphatic epoxy resins can be commercially available products. Examples of commercially available products thereof include DENACOL EX-252 (manufactured by Nagase ChemteX Corporation), and EHPE3150 and EHPE3150CE (manufactured by Daicel Corporation).

The alcohol-modified polyamide-imide resin (A2) and the epoxy resin (B1) having two or more epoxy groups in the molecule thereof can be freely combined according to physical properties for various purposes. However, in terms of balance between thermal properties, such as Tg, and mechanical properties and the transparency of a cured film, preferably, the alcohol-modified polyamide-imide resin (A2) and the epoxy resin (B1) are combined such that the ratio [n(EPDXY)/n(COOH)] of the mole number n(EPDXY) of epoxy groups in the epoxy resin (B1) having two or more epoxy groups in the molecule thereof to the mole number n(COOH) of carboxyl groups in the alcohol-modified polyamide-imide resin (A2) is in a range of 0.3 to 4. In this case, Tg, as a characteristic of a cured product, can be easily obtained, a cured product having excellent mechanical properties can be obtained, and the transparency of the cured product becomes good.

The curable resin composition of the present invention may be mixed with an epoxy-carboxylic acid curing catalyst. Examples of the epoxy-carboxylic acid curing catalyst include known epoxy curing accelerators, including: nitrogen-based compounds, such as primary to tertiary amines for reaction promotion, quaternary ammonium salts, dicyandiamide, and imidazole compounds; phosphine-based compounds, such as triphenyl phosphine (TPP) and alkyl-substituted trialkyl phenyl phosphines, derivatives thereof and phosphonium salts thereof; dialkyl ureas; carboxylic acids; phenols; and methylol group-containing compounds. They can be used in combination in small amounts.

Examples of the compound (B2) having two or more maleimide groups in one molecule (Hereinafter, referred to as "maleimide compound (B2)") include: N-aliphatic maleimides, such as N-cyclohexyl maleimide, N-methyl maleimide, N-n-butyl maleimide, N-hexyl maleimide, and N-tert-butyl maleimide; N-aromatic maleimides, such as N-phenyl maleimide, N—(P-methylphenyl) maleimide, and N-benzyl maleimide; and bismaleimides, such as 4,4'-diphenylmethane bismaleimide, 4,4'-diphenylsulfone bismaleimide, m-phenylene bismaleimide, bis(3-methyl-4-maleimidephenyl) methane, bis(3-ethyl-4-maleimidephenyl) methane, bis(3,5-dimethyl-4-maleimidephenyl) methane, bis(3-ethyl-5-methyl-4-maleimidephenyl) methane, and bis(3,5-diethyl-4-maleimidephenyl) methane. Among these, from the viewpoint of making the heat resistance of a cured product good, bismaleimides are preferable, and 4,4'-diphenylmethane bismaleimide, bis(3,5-dimethyl-4-maleimidephenyl) methane, bis(3-ethyl-5-methyl-4-maleimidephenyl) methane, and bis (3,5-diethyl-4-maleimidephenyl) methane are particularly preferable. When the maleimide compound (B2) is used in the curable resin composition of the present invention, if necessary, it is possible to use a curing accelerator. Examples of the curing accelerator that can be used herein include amine compounds, phenol compounds, acid anhydrides, imidazoles, and organic metal salts.

As the reactive diluent (C) used in the present invention, commonly known photopolymerizable vinyl monomers can be used. Representative examples thereof include: alkyl (meth)acrylates, such as dimethylaminoethyl acrylate, diethylaminoethyl acrylate, ethylene glycol diacrylate, diethylene glycol diacrylate, triethylene glycol diacrylate, polyethylene glycol diacrylate, propylene glycol diacrylate, dipropylene glycol diacrylate, tripropylene glycol diacrylate, polypropylene glycol diacrylate, trimethylolpropane diacrylate, trimethylolpropane triacrylate, pentaerythritol tetraacrylate, dipentaerythritol pentaacrylate, dipentaerythritol hexaacrylate, acryloyl morpholine, vinyl pyrrolidone, styrene, tris(2-acryloyloxyethyl) isocyanurate, methyl methacrylate, and ethyl acrylate, or methacrylates for the above acrylates; mono-, di-, tri- or more polyesters of polybasic acids and hydroxyalkyl (meth)acrylates; monomers and oligomers having an ethylenically unsaturated double bond, such as bisphenol A type epoxy acrylate, novolak type epoxy acrylate, and urethane acrylate. They can be used alone or in combination of two or more.

The alcohol-modified polyamide-imide resin (A2) and the reactive diluent (C) can be freely combined according to physical properties for various purposes. However, in terms of balance between thermal properties, such as Tg, and mechanical properties and the transparency of a cured film, preferably, the alcohol-modified polyamide-imide resin (A2) and the reactive diluent (C) are combined such that the ratio [A2/C] of the alcohol-modified polyamide-imide resin (A2) to photopolymerizable groups of the reactive diluent (C) is in a range of 0.2 to 5.0 based on mass. In this case, Tg, as a characteristic of a cured product, can be easily obtained, a cured product having excellent mechanical properties can be obtained, and the transparency of the cured product becomes good.

In the curable resin composition of the present invention, upon further curing, a photopolymerization initiator (D) can be used when the composition is cured by irradiating the composition with energy rays, particularly, ultraviolet rays. Such a photopolymerization initiator (D) is not particularly limited, and commonly known photopolymerization initiators can be used. Representative examples thereof include: benzoin and benzoin alkyl ethers, such as benzoin, benzoin methyl ether, benzoin ethyl ether, and benzoin isopropyl ether; acetophenones, such as acetophenone, 2,2-dimethoxy-phenyl acetophenone, 2,2-diethoxy-phenyl acetophenone, and 1,1-dichloro-acetophenone; anthraquinones, such as 2-methyl anthraquinone, 2-ethyl anthraquinone, 2-tert-butyl anthraquinone, 1-chloro-anthraquinone, and 2-aluminum anthraquinone; thioxanthones, such as 2,4-dimethyl thioxanthone, 2,4-diethyl thioxanthone, 2-chloro thioxanthone, and 2,4-diisopropyl thioxanthone; trimethyl benzoyl alkyl phosphine oxides, such as bis(2,6-dimethoxybenzoyl)-2,4,4-trimethylpentyl phosphine oxide and 2,4,6-trimethyl-benzoyl diphenyl phosphine oxide; ketals, such as acetophenone dimethyl ketal and benzyl dimethyl ketal; benzophenones, such as benzophenone; and xanthones. They can be used alone or in combination of two or more.

The amount of the photopolymerization initiator (D) used is not particularly limited as long as effects of the present invention do not deteriorate. Generally, the amount thereof is preferably in a range of 0.1 parts by mass to 30 parts by mass, and more preferably in a range of 0.5 parts by mass to 10 parts by mass, with respect to 100 parts by mass of the alcohol-modified polyamide-imide resin (A2). Such a photopolymerization initiator can be used in combination with one or two or more kinds of commonly known photopolymerization accelerators.

If necessary, an organic solvent (E) can be contained in the curable resin composition of the present invention. When the organic solvent (E) can be contained in the curable resin composition of the present invention, the organic solvent (E) can be the same as the solvent used in preparing the alcohol-modified polyamide-imide resin (A2).

In addition, if necessary, other curing agents and thermal curing accelerators can be used. Moreover, additives, such as a polymerization inhibitor, a thixotropic imparting agent, a defoamer, a leveling agent, and a coupling agent, can be used.

The curing of the curable resin composition of the present invention can be basically performed while suitably selecting and adjusting the kinds, combination ratio and curing conditions of the alcohol-modified polyamide-imide resin (A2), the curable resin (B), and other components.

The method of curing the curable resin composition of the present invention can use active energy ray curing, thermal curing, or a combination of both. That is, the curable resin composition can be semi-cured by active energy ray curing and then cured by thermal curing, can be semi-cured by thermal curing and then cured by active energy ray curing, or can be cured by performing both active energy ray curing and thermal curing.

When the curable resin composition is cured by active energy rays, ultraviolet rays or electron beams can be used. As the ultraviolet source, an ultra-high pressure mercury lamp, a high pressure mercury lamp, a low pressure mercury lamp, a carbon arc, a black light lamp, or a metal halide lamp can be used. As the ultraviolet wavelength, a wavelength of 1900 to 3800 Angstrom is generally used. When curing is performed by electron beams, a device provided with irradiation sources, such as various electron beam accelerators, can be used, and the curable resin composition is irradiated with electrons having energy of 100 KeV to 1,000 KeV.

In addition, when the curable resin composition is cured by heat, the curing is performed at a curing temperature of 80° C. to 300° C., and preferably 120° C. to 250° C., in the presence of a catalyst for initiating thermal polymerization or an additive. For example, the curable resin composition can be cured by heating after casting this composition onto a coated object. It is also possible to perform stepwise curing at various temperatures. In addition, a sheet-like or coating film-like composition semi-cured at a temperature of about 50° C. to 170° C. may be stored, and then treated at the aforementioned curing temperature, if necessary.

Of course, even when the curable resin composition may be cured by both active energy rays and heat, the use thereof is not limited at all.

If necessary, the curable resin composition of the present invention may be blended with other solvents, various leveling agents, various additives such as an antifoaming agent, an antioxidant, an age resister, an ultraviolet absorber, an anti-settling agent, and a rheology control agent, known common fillers such as barium sulfate, silicon oxide, talc, clay, calcium carbonate, silica, colloidal silica, and glass, various metal powders, fibrous fillers such as glass fibers, carbon fibers, and Kevlar fibers, known common coloring pigments such as phthalocyanine blue, phthalocyanine green, titanium oxide, carbon black, and silica, and other adhesion-imparting agents. If necessary, the curable resin composition of the present invention can also be blended with polymers such as an acrylic resin, a cellulose-based resin, a polyvinyl resin, polyphenylene ether, and polyether sulfone.

In order to allow the cured product to exhibit flame retardance, the curable resin composition of the present invention may be blended with a non-halogen-based flame retardant which does not substantially contain halogen atoms within a range not to impair the effects of the present invention. Examples of the non-halogen-based flame retardant include phosphorus-based flame retardants, nitrogen-based flame retardants, silicone-based flame retardants, inorganic flame retardants, and organic metal salt-based flame retardants. These are used without limits, and may be used alone or in combination of two or more of the same kind. Different kinds of flame retardants can also be used in combination.

As the phosphorus-based flame retardant, any of an inorganic phosphorus-based flame retardant and an organic phosphorus-based flame retardant can be used. Examples of the inorganic compound include ammonium phosphates such as red phosphorus, monoammonium phosphate, diammonium phosphate, triammonium phosphate, and ammonium polyphosphate, and inorganic nitrogen-containing phosphorus compounds such as amide phosphate. The red phosphorus is preferably surface-treated to prevent hydrolysis and the like. Examples of the surface-treating method include (i) a coating method using an inorganic compound such as magnesium hydroxide, aluminum hydroxide, zinc hydroxide, titanium hydroxide, bismuth oxide, bismuth hydroxide, bismuth nitrate, or a mixture thereof, (ii) a coating method using a mixture of an inorganic compound such as magnesium hydroxide, aluminum hydroxide, zinc hydroxide, or titanium hydroxide and a thermosetting resin such as a phenolic resin, and (iii) a double coating method using an inorganic compound such as magnesium hydroxide, aluminum hydroxide, zinc hydroxide, or titanium hydroxide and then using a thermosetting resin such as a phenolic resin on the coating of the inorganic compound. Examples of the organic phosphorus-based compound include common organic phosphorus-based compounds such as phosphate compounds, phosphonate compounds, phosphine compounds, phosphine oxide compounds, phospholan compounds, and organic nitrogen-containing phosphorus compounds, and cyclic organic phosphorus compounds such as 9,10-dihydro-9-oxa-10-phosphaphenanthrene=10-oxide, 10-(2,5-dihydroxyphenyl)-10H-9-oxa-10-phosphaphenanthrene=10-oxide, and 10-(2,7-dihydroxynaphthyl)-10H-9-oxa-10-phosphaphenanthrene=10-oxide and derivatives which are allowed to react with a compound such as epoxy resin or phenolic resin and the like. The amount of the compound blended is appropriately selected according to the type of the phosphorus-based flame retardant, other components of the curable resin composition, and the desired degree of flame retardancy. For example, when red phosphorus is used as a non-halogen flame retardant, 0.1 parts by mass to 2.0 parts by mass of red phosphorus is preferably used in 100 parts by mass of a curable resin composition containing a polyamide-imide resin (A2), a curable resin (B) and/or a reactive diluent (C), a curing agent, a non-halogen-based flame retardant, and other fillers and additives blended therein. When an organic phosphorus compound is used, preferably 0.1 parts by mass to 10.0 parts by mass, and particularly preferably 0.5 parts by mass to 6.0 parts by mass of the organic phosphorus compound is blended. In addition, when the phosphorus-based flame retardant is used, the phosphorus-based flame retardant may be used together with hydrotalcite, magnesium hydroxide, boride compounds, zirconium oxide, black dye, calcium carbonate, zeolite, zinc molybdate, activated carbon, or the like.

Examples of the nitrogen-based flame retardant include triazine compounds, cyanuric acid compounds, isocyanuric acid compounds, and phenothiazine. Triazine compounds, cyanuric acid compounds, and isocyanuric acid compounds are preferred. Examples of the triazine compounds include melamine, acetoguanamine, benzoguanamine, melon, melam, succinoguanamine, ethylenedimelamine, melamine polyphosphate, triguanamine, (i) aminotriazine sulfate compounds such as guanylmelamine sulfate, melem sulfate, and melam sulfate, (ii) co-condensates of phenols such as phenol, cresol, xylenol, butylphenol, and nonylphenol with melamines such as melamine, benzoguanamine, acetoguanamine, and formguanamine and formaldehyde, (iii) mixtures of (ii) the co-condensates and phenolic resins such as a phenol-formaldehyde condensate, and (iv) materials obtained by modifying (ii) and (iii) with a tung oil, an isomerized linseed oil, or the like. Specific examples of the cyanuric acid compounds include cyanuric acid and melamine cyanurate. The amount of the nitrogen-based flame retardant blended is appropriately selected according to the type of the nitrogen-based flame retardant, other components of the curable resin composition, and the desired degree of flame retardancy. For example, preferably 0.05 parts by mass to 10 parts by mass, and particularly preferably 0.1 parts by mass to 5 parts by mass of the nitrogen-based flame retardant is contained in 100 parts by mass of a curable resin composition containing a polyamide-imide resin (A2), a curable resin (B) and/or a reactive diluent (C), a curing agent, a non-halogen-based flame retardant, and other fillers and additives blended therein. When the nitrogen-based flame retardant is used, it may be used together with a metal hydroxide, a molybdenum compound, or the like.

Any silicone-based flame retardant can be used without particular limits as long as it is an organic compound containing a silicon atom. Examples thereof include a silicone oil, a silicone rubber, and a silicone resin. The amount of the silicone-based flame retardant blended is appropriately selected according to the type of the silicone-based flame retardant, other components of the curable resin composition, and the desired degree of flame retardancy. For example, preferably 0.05 parts by mass to 20 parts by mass of the silicone-based flame retardant is contained in 100 parts by mass of a curable resin composition containing a polyamide-imide resin (A2), a curable resin (B) and/or a reactive diluent (C), a curing agent, a non-halogen-based flame retardant, and other fillers or additives blended therein. When the silicone-based flame retardant is used, it may be used together with a molybdenum compound, alumina, or the like.

Examples of the inorganic flame retardant include metal hydroxides, metal oxides, metal carbonate compounds, metal powders, boron compounds, and low-melting-point glass. Specific examples of the metal hydroxides include aluminum hydroxide, magnesium hydroxide, dolomite, hydrotalcite, calcium hydroxide, barium hydroxide, and zirconium hydroxide. Specific examples of the metal oxides include zinc molybdate, molybdenum trioxide, zinc stannate, tin oxide, aluminum oxide, iron oxide, titanium oxide, manganese oxide, zirconium oxide, zinc oxide, molybdenum oxide, cobalt oxide, bismuth oxide, chromium oxide, nickel oxide, copper oxide, and tungsten oxide. Specific examples of the metal carbonate compounds include zinc carbonate, magnesium carbonate, calcium carbonate, barium carbonate, basic magnesium carbonate, aluminum carbonate, iron carbonate, cobalt carbonate, and titanium carbonate. Specific examples of the metal powders include aluminum, iron, titanium, manganese, zinc, molybdenum, cobalt, bismuth, chromium, nickel, copper, tungsten, and tin. Specific examples of the boron compounds include zinc borate, zinc metaborate, barium metaborate, boric acid, and borax. Specific examples of the low-melting-point glass include Seaplea (Bokusui Brown Co., Ltd.), hydrated glass $SiO_2$—MgO—$H_2O$, and glassy compounds based on PbO—$B_2O_3$, ZnO—$P_2O_5$—MgO, $P_2O_5$—$B_2O_3$—PbO—MgO, P—Sn—O—F, PbO—$V_2O_5$—$TeO_2$, $Al_2O_3$—$H_2O$, and lead borosilicate. The amount of the inorganic flame retardant blended is appropriately selected according to the type of the inorganic flame retardant, other components of the curable resin composition, and the desired degree of flame retardancy. For example, preferably 0.05 parts by mass to 20 parts by mass, and particularly preferably 0.5 parts by mass to 15 parts by mass of the inorganic flame retardant is contained in 100 parts by mass of a curable resin composition containing a polyamide-imide resin (A2), a curable resin (B) and/or a reactive diluent (C), a curing agent, a non-halogen-based flame retardant, and other fillers and additives blended therein. Examples of the organic metal salt-based flame retardants include ferrocene, acetylacetonate metal complex, organic metal carbonyl compounds, organic cobalt salt compounds, organic sulfonic acid metal salts, and compounds having an ionic bond or coordinate bond between a metal atom and an aromatic compound or heterocyclic compound. The amount of the organic metal salt-based flame retardant blended is appropriately selected according to the type of the organic metal salt-based flame retardant, other components of the curable resin composition, and the desired degree of flame retardancy. For example, preferably 0.005 parts by mass to 10 parts by mass of the organic metal salt-based flame retardant is contained in 100 parts by mass of a curable resin composition containing a polyamide-imide resin (A2), a curable resin (B) and/or a reactive diluent (C), a curing agent, a non-halogen-based flame retardant, or other fillers and additives blended therein.

The curable resin composition of the present invention is soluble in a general-purpose solvent, and a cured film having excellent heat resistance and optical transparency is obtained therefrom. Therefore, it can be appropriately used in fields requiring transparency of a cured product, such as fields for optical materials, fields for solder resist materials of printed wiring boards, protective materials and insulating materials of household appliances, such as refrigerators and rice cookers, and protective materials, insulating materials, adhesives, and reflective materials used in liquid crystal displays and liquid crystal display elements, organic and inorganic electroluminescence displays and organic and inorganic electroluminescence display elements, LED displays, light-emitting diodes, electronic papers, solar batteries, through silicon vias (TSV), optical fibers, optical waveguides, and the like, and fields for display devices, such as liquid crystal alignment films, protective films for color filters, and the like.

Needless to say, the curable resin composition of the present invention can also be used in fields not requiring transparency of a cured product, such as various heat-resistant coating materials and heat-resistant adhesives; electric insulating materials such as electric/electronic component sealing materials, insulating varnishes, laminated plates, insulating powder coating materials, passivation films of semiconductors, and gate insulating films; conductive materials such as conductive films and conductive adhesives; adhesives for structural materials such as laminated plates, prepregs, and honeycomb panels for printed wiring boards; fiber-reinforced plastics and prepregs thereof using various reinforced fibers such as glass fibers, carbon fibers, and aramid fibers; patterning materials such as resist inks; and gaskets of non-aqueous electrolyte secondary batteries such as lithium ion secondary batteries.

Since the curable resin composition of the present invention is soluble in a general-purpose solvent, and a cured film having excellent heat resistance and optical transparency is obtained therefrom, it can be appropriately used in white prepregs, white laminated plates, and chip LEDs including the white laminated plates. This will be described in detail as follows.

The white prepreg of the present invention is obtained by impregnating or coating a sheet-like glass fiber base material with a mixture containing the curable resin composition of the present invention and a white pigment, and by then drying the mixture. Specifically, a sheet-like glass fiber base material is impregnated or coated with a mixture containing the curable resin composition of the present invention and a white pigment, and then the mixture is semi-cured for 1 minute to 60 minutes in a dryer of 100° C. to 200° C. The white prepreg and the method of manufacturing the white prepreg will be described in detail as follows.

Examples of the white pigment include zinc oxide, calcium carbonate, titanium dioxide, alumina, and synthetic smectite. The white pigment is not particularly limited as long as it is white inorganic powder. From the viewpoint of visible light reflectance and whiteness or electrical characteristics, it is most preferable to use titanium dioxide.

The crystal structure of titanium dioxide includes an anatase type structure and a rutile type structure. Explaining the characteristics of both, the anatase type structure has good reflectance in a visible light short-wavelength area, and the rutile type structure has excellent long-term durability and color fastness. The white pigment added to the curable resin composition of the present invention is not particularly limited. It is also possible to use a mixture of both.

The content of white pigment in the mixture may be in a range of 10 mass % to 75 mass %. When the content thereof is 10 mass % or more, sufficient whiteness and reflectance can be obtained, and when the content thereof is 75 mass % or less, there is no occurrence of a problem of decreasing the impregnation into a sheet-like glass fiber base material or the adhesive strength to metal foil.

When titanium dioxide is used as the white pigment, the titanium dioxide may be surface-treated with alumina, silica, or the like. In addition, the titanium dioxide can also be surface-treated with a silane coupling agent or a titanate coupling agent.

The mixture, with which a sheet-like glass fiber base material is impregnated, can contain an inorganic filler, such as silica, in addition to the white pigment, if necessary. Examples of the inorganic filler that can be contained in the mixture include silica, aluminum hydroxide, magnesium hydroxide, E glass powder, magnesium oxide, potassium titanate, calcium silicate, clay, and talc. These inorganic fillers may be used alone or in combination of two or more. When these inorganic fillers are contained, the rigidity modulus of a substrate is improved. The combination amount of the inorganic filler is not particularly limited, but is preferably 50 mass % or less with respect to the mixture. when the amount thereof is 50 mass % or less, there is hardly a possibility of causing a problem of decreasing the impregnation into a sheet-like glass fiber base material or the adhesive strength to metal foil.

The mixture, with which a sheet-like glass fiber base material is impregnated, can be combined with a fluorescent agent in addition to the white pigment and the inorganic filler, if necessary. The reflectance apparent in the visible light short-wavelength area can be increased by the combination of the fluorescent agent. Here, the fluorescent agent refers to a compound having characteristics of absorbing light energy, such as light, radiation, or ultraviolet, and converting it into light having other wavelengths and emitting this light. Examples of organic fluorescent agents include diaminostilbene derivatives, anthracenes, sodium salicylate, diaminostilbene disulfonic acid derivatives, imidazole derivatives, coumarin derivatives, pyrazoline derivatives, and decalylamine derivatives. Examples of inorganic fluorescent agents include ZnCdS:Ag, ZnS:Pb, and ZnS:Cu. In the fluorescent agent, preferably, emission wavelength exists in the visible light short-wavelength area (380 nm to 470 nm) in which reflectance is remarkably decreased. Among the above fluorescent agents, diaminostilbene disulfonic acid derivatives, imidazole derivatives, coumarin derivatives, and pyrazoline derivatives, each of which is generally referred to as a fluorescent whitening agent, are preferable. The addition amount of the fluorescent agent is not particularly limited, but, in the case of pyrazoline derivatives, the addition amount thereof is about 0.1 mass % with respect to the mixture. In this case, effects are exhibited. Effects increase as the addition amount increases. Further, it is desired that the fluorescent whitening agent to be added is soluble in a solvent.

As the sheet-like glass fiber base material used in the white prepreg of the present invention, any of glass cloth and non-woven fabric may be used, and a combination of glass cloth and non-woven fabric may also be used. In the case of glass cloth, a plain-woven structure is used as a basic structure, but woven structures, such as a mat-woven structure, a satin-woven structure, and twill-woven structure may also be used, and are not particularly limited. In order not to impair appearance and processability, it is preferable to use a woven structure having a small clearance of an intersection of warp and weft. The thickness of glass cloth is not particularly limited, but is preferably in a range of 0.02 mm to 0.3 mm. In this case, glass cloth is easily treated, which is preferable.

The sheet-like glass fiber base material may be surface-treated with a silane coupling agent or the like. In addition, the sheet-like glass fiber base material itself may be colored in white.

A solvent, such as methyl ethyl ketone, is added to the aforementioned mixture, if necessary, to prepare a resin varnish, and the sheet-like glass fiber base material made of glass cloth or the like is impregnated with the resin varnish and dried to manufacture a white prepreg. The method of impregnating the sheet-like glass fiber base material with the resin varnish and drying the resin varnish is not particularly limited. For example, a method of dipping the sheet-like glass fiber base material into the resin varnish to impregnate the base material with the resin varnish and heating the base material impregnated with resin varnish to a temperature of about 100° C. to 200° C. for 1 to 60 minutes to remove a solvent and semi-cure the curable resin can be employed. The impregnation amount of the curable resin composition in the white prepreg manufactured by impregnating the sheet-like glass fiber base material with the resin varnish and drying the resin varnish is not particularly limited, but is preferably in a range of 30 mass % to 60 mass %. For the selection of drying conditions of the prepreg, for example, it is preferable to previously measure the gel time of the resin varnish by a gel time tester (manufactured by Yasuda Seiki seisakusho LTD.). Here, as the measuring condition of gel time, when gel time (curing time: time required until torque of a rotor reaches about 3.3 Kg·cm) at 160° C. was measured by the tester, the gel time of the resin varnish is preferably in a range of 5 minutes or more to less than 15 minutes, and more preferably in a range of 5 minutes or more to less than 10 minutes. When the gel time of the resin varnish is short, a semi-cured state cannot be maintained, and it is difficult to manufacture a uniform prepreg. When the resin varnish reaches a cured state without maintaining a semi-cured state, it is difficult for the resin varnish to bond with metal foil. Therefore, it is preferable to semi-cure the resin varnish by the measurement of varnish gel time under the conditions in process.

A white laminate is manufactured by hot-pressing a combination of the obtained white prepreg with copper foil or aluminum foil. The number of white prepreg sheets to be overlapped is not particularly limited. However, in a single-layer substrate, one white prepreg sheet is provided, or 2 to 10 white prepreg sheets are overlapped, and, in the case of a metal foil-clad white laminate, it is general to apply metal foil thereon or thereon and therebeneath. A multi-layer substrate is manufactured by stacking the plurality of single-layer substrates, but the number of the single-layer substrates to be overlapped is not particularly limited. As the metal foil, copper foil, aluminum foil, or the like is used. The thickness of the metal foil is generally in a range of 1 µm to 105 µm, and particularly preferably in a range of 1.5 µm to 35 µm. The white prepreg is used only in the surface layer of the laminate, and a prepreg known in the art can be used in the intermediate layer thereof. The white laminate and metal foil-clad white laminate obtained in this way become a white laminate for printed wiring board and a metal foil-clad white laminate, which have high reflectance in the visible light area, in which discoloration due to heating or ultraviolet is remarkably reduced, and which have high heat resistance and excellent thickness accuracy. As the laminate forming condition of a metal foil-clad laminate, a method of forming a general laminate for printed wiring board can be employed. For example, a multi-stage press, a multi-stage vacuum press, a continuous forming machine, an autoclave forming machine, or the like is used, and the formation of metal foil-clad laminate is generally performed under the conditions of a temperature range of 100° C. to 300° C., a pressure range of 2 kgf/cm$^2$ to 100 kgf/cm$^2$, and a heating time range of 0.1 hours to 5 hours. However, from the viewpoint of uniformity of insulating layer thickness, removal of air bubbles, and the like, the formation of metal foil-clad laminate is preferably performed under a vacuum of 70 mmHg or less.

A conductor pattern is formed on the obtained white laminate by an active method to make a printed wiring board. Further, a circuit pattern is printed on the metal foil of the obtained metal foil-clad white laminate, and etching is carried out to make a printed wiring board. In order to mount a chip LED on the printed wiring board, first, solder is applied onto the printed wiring board, the chip LED is placed thereon, and then the solder is melted through reflow or the like, thereby fixing the chip LED on the printed wiring board. When the chip LED is integrated in high density, it can be used as a surface light source. Such a surface light source is suitably used for a backlight for thin liquid crystal display. In addition, this surface light source is practically applied to an induction display light, an emergency exit light, an advertising light, or the like, as a surface-emitting lighting device.

The thickness accuracy of a chip LED-mounted substrate is very important in sealing elements mounted on the substrate by transfer forming. Here, the transfer forming refers to a technique of injecting a resin into a clamped mold. The thickness of the substrate used in the chip LED is generally 0.06 mm to 1.0 mm. However, when the thickness accuracy is poor, at the time of transfer forming, a clearance is generated between the substrate and the mold during mold clamping, and thus the injected resin leaks out through the clearance, thereby causing a forming failure. For example, the thickness accuracy of the substrate required in transfer forming is tolerance±0.05 mm or less (range is 0.1 mm), and preferably tolerance±0.03 mm or less (range is 0.06 mm), when the thickness of the substrate is 1.0 mm. Therefore, when the substrate is a substrate having high thickness accuracy, the defect rate in the method of manufacturing the chip LED can be greatly reduced, and this substrate is very industrially significant.

When the curable resin composition of the present invention is used as a patterning material, for example, the curable resin composition of the present invention is applied onto a base material, a solvent is dried, the based material coated with the composition is irradiated with energy rays through a mask having a pattern, followed by developing with alkaline aqueous solution or solvent, so as to form a pattern. It is possible to form a stronger pattern by performing heat treatment at 80° C. or higher. Hereinafter, the process of forming a pattern will be described in detail.

First, a photosensitive film, which includes a support and a photosensitive resin composition layer formed on the support and made of the curable resin composition of the present invention, is manufactured. The photosensitive resin composition layer may be further provided thereon with a protective film for covering the photosensitive resin composition layer.

Preferably, the photosensitive resin composition layer is formed by dissolving the curable resin composition of the present invention in a solvent or a mixed solvent to obtain a solution having a solid content of 30 to 70 mass % and then applying this solution onto the support. The thickness of the photosensitive resin composition layer, although varies depending on the use thereof, is preferably 10 µm to 100 µm, and more preferably 20 µm to 60 µm, based on the thickness after drying for removing the solvent by heating or hot air blowing. When this thickness is less than 10 µm, coating tends to be industrially difficult, and when the thickness is more than 100 µm, the above-described effects of the present invention tend to decrease, and, particularly, physical characteristics and resolution tend to decrease.

Examples of the support of the photosensitive film include polymer films having heat resistance and solvent resistance, such as a polyester film (for example, polyethylene terephthalate film), a polypropylene film, and a polyethylene film. The thickness of the support is preferably 5 µm to 100 µm, and more preferably 10 µm to 30 µm. When this thickness is less than 5 µm, the support tends to be easily broken at the time of separating the support before developing, and when the thickness is more than 100 µm, resolution and flexibility tend to deteriorate. A two-layer photosensitive film including the above-described support and photosensitive resin composition layer, or a three-layer photosensitive film including the support, the photosensitive resin composition layer, and the protective film, for example, may be stored as it is, or can be stored by winding a core rolled with the interposed protective film in a roll shape.

In the method of forming a resist pattern using the photosensitive resin composition or photosensitive film of the present invention, firstly, lamination is performed on a resist forming substrate by an application process using screen printing or roll coater known in the art or an attaching process using lamination by removing the protective film. Then, if necessary, a removal process of removing the support film from the above photosensitive film is performed, or an exposure process of irradiating a predetermined portion of the photosensitive resin composition layer with active light through a mask pattern without removing the support film to photocure the irradiated portion of the photosensitive resin composition layer is performed. When the support film exists, this support film is removed, and then the non-irradiated portion of the photosensitive resin composition layer is removed by the following developing process. Here, the resist forming substrate refers to a printed wiring board, a semiconductor package substrate, or a flexible wiring board.

Examples of the light source of active light include known light sources, such as a carbon arc lamp, a mercury vapor arc lamp, an ultra-high pressure mercury lamp, a high pressure mercury lamp, and a xenon lamp, which are light sources effectively emitting ultraviolet light. Examples thereof further include light sources effectively emitting visible light, such as a flood bulb for photography and a solar lamp. In addition, direct writing type direct laser exposure may also be used. Meanwhile, more excellent pattern can be formed by other laser light sources or a photopolymerization initiator (D) corresponding to the exposure method.

In the developing process, an alkaline developer, such as a dilute solution of sodium carbonate (1 mass % to 5 mass % aqueous solution) of 20° C. to 50° C., is used as the developer. This developing process is performed by a known method, such as spraying, shake dipping, brushing, or scrubbing.

After the developing process, for the purpose of improving solder heat resistance, chemical resistance, and the like, preferably, ultraviolet irradiation using a high pressure mercury lamp or heat is performed. In the case of ultraviolet irradiation, if necessary, the irradiance level thereof can be adjusted. For example, the ultraviolet irradiation can be performed at an irradiance level of about 0.2 J/cm$^2$ to 10 J/cm$^2$. In the case of heating a resist pattern, preferably, the heating is performed at 100° C. to 170° C. for 15 minutes to 90 minutes. Meanwhile, when both the ultraviolet irradiation and the heating are performed, any one thereof can be performed and then the other one thereof can be performed. When both the ultraviolet irradiation and the heating are performed, from the viewpoint of effectively exhibiting solder heat resistance and chemical resistance, preferably, the resist pattern is heated to 60° C. to 150° C.

This photosensitive resin composition layer is useful as a solder resist for a printed wiring board, a semiconductor package substrate, or a flexible wiring board, because it also serves as a protective film of wiring after applying a solder onto a substrate and has excellent crack resistance, HAST resistance, and gold plating properties.

This substrate provided with the resist pattern is then mounted with semiconductor elements (for example, wiring bonding or solder connection), and is mounted on an electronic appliance, such as a personal computer or the like.

EXAMPLES

Next, the present invention will be described in more detail with reference to Examples. In Examples, "Part" and "%" are based on mass, unless especially otherwise described.

Synthesis Example 1

[Preparation of Polyamide-Imide Resin (A1-1)]
1086 g of PGMAc (propylene glycol monomethyl ether acetate), 587.3 g (0.80 mol) of IPDI3N (isocyanurate type triisocyanate synthesized from isophorone diisocyanate: NCO %=17.2), and 499.1 g (2.52 mol) of cyclohexane-1,3,4-tricarboxylic acid-3,4-anhydride were put into a flask provided with a stirrer, a thermometer, and a condenser, and were heated to 140° C. The reaction proceeded with foaming. The reaction was performed at this temperature for 8 hours. The reaction product became a faintly-yellow liquid in the system. As a result of measuring the characteristic absorption of the reaction product by an infrared spectrum, an absorption at 2270 $cm^{-1}$, which is characteristic absorption of an isocyanate group, completely disappeared, and absorption of an imide group was observed at 1780 $cm^{-1}$ and 1720 $cm^{-1}$. The acid value of the reaction product was 212 KOHmg/g based on solid content. In the molecular weight of the reaction product, the number average molecular weight thereof was 4700 based on polystyrene. The concentration of an acid anhydride group was 1.14 mmol/g based on solid content. The concentration of resin content was 47.4 mass %. The solution of this resin is abbreviated as a solution of polyamide-imide resin (A1-1).

[Preparation of Alcohol-Modified Polyamide-Imide Resin (A2-1)]

Subsequently, 96.3 g (1.3 mol) of n-butanol was added to the obtained solution of the polyamide-imide resin (A1-1), followed by a reaction at 120° C. for 2 hours. As a result of measuring the characteristic absorption of the reaction product by an infrared spectrum, mass absorption of 1860 $cm^{-1}$, which is characteristic absorption of an acid anhydride group, completely disappeared. The acid value of the reaction product was 148 KOHmg/g based on solid content. In the molecular weight of the reaction product, the number average molecular weight thereof was 4800 based on polystyrene. The concentration of resin content was 49.2 mass %. The solution of this resin is abbreviated as alcohol-modified polyamide-imide resin (A2-1).

Synthesis Example 2

[Preparation of Polyamide-Imide Resin (A1-2)]

4628 g of EDGA (diethylene glycol monoethyl ether acetate), 2070 g (2.83 mol) of IPDI3N (isocyanurate type triisocyanate synthesized from isophorone diisocyanate: NCO %=17.2), and 1386 g (7 mol) of cyclohexane-1,3,4-tricarboxylic acid-3,4-anhydride were put into a flask provided with a stirrer, a thermometer, and a condenser, and were heated to 140° C. The reaction proceeded with foaming. The reaction was performed at this temperature for 8 hours. The reaction product became a faintly-yellow liquid in the system. As a result of measuring the characteristic absorption of the reaction product by an infrared spectrum, an absorption at 2270 $cm^{-1}$, which is characteristic absorption of an isocyanate group, completely disappeared, and absorption of an imide group was observed at 1780 $cm^{-1}$ and 1720 $cm^{-1}$. The acid value of the reaction product was 140 KOHmg/g based on solid content. In the molecular weight of the reaction product, the number average molecular weight thereof was 5800 based on polystyrene. The concentration of an acid anhydride group was 0.75 mmol/g based on solid content. The concentration of resin content was 40 mass %. The solution of this resin is abbreviated as a solution of polyamide-imide resin (A1-2).

[Preparation of Alcohol-Modified Polyamide-Imide Resin (A2-2)]

Subsequently, 326 g (2.5 mol) of 2-ethyl hexanol was added to the obtained solution of the polyamide-imide resin (A1-2), followed by a reaction at 120° C. for 2 hours. As a result of measuring the characteristic absorption of the reaction product by an infrared spectrum, an absorption of 1860 $cm^{-1}$, which is characteristic absorption of an acid anhydride group, completely disappeared. The acid value of the reaction product was 98 KOHmg/g based on solid content. In the molecular weight of the reaction product, the number average molecular weight thereof was 6,000 based on polystyrene. The concentration of resin content was 40.9 mass %. The solution of this resin is abbreviated as alcohol-modified polyamide-imide resin (A2-2).

Synthesis Example 3

[Preparation of Alcohol-Modified Polyamide-Imide Resin (A2-3)]

Alcohol-modified polyamide-imide resin (A2-3) was obtained in the same manner as in Synthesis Example 1, except that 153.7 g (1.3 mol) of butyl cellosolve was added to the polyamide-imide resin solution (A1-1) instead of 96.3 g (1.3 mol) of n-butanol, followed by a reaction at 120° C. for 2 hours. As a result of measuring the characteristic absorption of the reaction product by an infrared spectrum, absorption of 1860 $cm^{-1}$, which is characteristic absorption of an acid anhydride group, completely disappeared. The acid value of the reaction product was 145 KOHmg/g based on solid content. In the molecular weight of the reaction product, the number average molecular weight thereof was 4900 based on polystyrene. The concentration of resin content was 50.2 mass %.

Synthesis Example 4

[Preparation of Polyamide-Imide Resin (A1-4)]

1569 g of PGMAc (propylene glycol monomethyl ether acetate), 959 g (1.31 mol) of IPDI3N (isocyanurate type triisocyanate synthesized from isophorone diisocyanate: NCO %=17.2), and 791 g (4.12 mol) of trimellitic anhydride were put into a flask provided with a stirrer, a thermometer, and a condenser, and were heated to 140° C. The reaction proceeded with foaming. The reaction was performed at this temperature for 8 hours. The reaction product became a faintly-yellow liquid in the system. As a result of measuring the characteristic absorption of the reaction product by an infrared spectrum, an absorption at 2270 $cm^{-1}$, which is characteristic absorption of an isocyanate group, completely disappeared, and absorption of an imide group was observed at 1780 $cm^{-1}$ and 1720 $cm^{-1}$. The acid value of the reaction product was 185 KOHmg/g based on solid content. In the molecular weight of the reaction product, the number average molecular weight thereof was 5700 based on polystyrene. The concentration of an acid anhydride group was 0.57 mmol/g based on solid content. The concentration of resin content was 50.2 mass %. The solution of this resin is abbreviated as a solution of polyamide-imide resin (A1-4).

[Preparation of Alcohol-Modified Polyamide-Imide Resin (A2-4)]

Subsequently, 79.9 g (1.08 mol) of n-butanol was added to the obtained solution of the imide resin (A1-4), followed by a reaction at 120° C. for 5 hours. As a result of measuring the characteristic absorption of the reaction product by an infrared spectrum, an absorption at 1860 $cm^{-1}$, which is characteristic absorption of an acid anhydride group, completely disappeared. The acid value of the reaction product was 153 KOHmg/g based on solid content. In the molecular weight of the reaction product, the number average molecular weight thereof was 5800 based on polystyrene. The concentration of resin content was 51.1 mass %. The solution of this resin is abbreviated as alcohol-modified polyamide-imide resin (A2-4).

Comparative Synthesis Example 1

[Preparation of Polyamide-Imide Resin (a1)]

1086 g of PGMAc (propylene glycol monomethyl ether acetate), 587.3 g (0.80 mol) of IPDI3N (isocyanurate type triisocyanate synthesized from isophorone diisocyanate: NCO %=17.2), and 499.1 g (2.52 mol) of cyclohexane-1,3,4-tricarboxylic acid-3,4-anhydride were put into a flask provided with a stirrer, a thermometer, and a condenser, and were heated to 140° C. The reaction proceeded with foaming. The reaction was performed at this temperature for 8 hours. The reaction product became a faintly-yellow liquid in the system. As a result of measuring the characteristic absorption of the reaction product by an infrared spectrum, an absorption at 2270 $cm^{-1}$, which is characteristic absorption of an isocyanate group, completely disappeared, and an absorption of an imide group was observed at 1780 $cm^{-1}$ and 1720 $cm^{-1}$. The acid value of the reaction product was 212 KOHmg/g based on solid content. In the molecular weight of the reaction product, the number average molecular weight thereof was 4700 based on polystyrene. The concentration of an acid anhydride group was 1.14 mmol/g based on solid content. The concentration of resin content was 47.4 mass %. The solution of this resin is abbreviated as a solution of comparative polyamide-imide resin (a1).

Comparative Synthesis Example 2

[Preparation of Polyamide-Imide Resin (a2)]

1569 g of PGMAc (propylene glycol monomethyl ether acetate), 959 g (1.31 mol) of IPDI3N (isocyanurate type triisocyanate synthesized from isophorone diisocyanate: NCO %=17.2), and 791 g (4.12 mol) of trimellitic anhydride were put into a flask provided with a stirrer, a thermometer, and a condenser, and were heated to 140° C. The reaction proceeded with foaming. The reaction was performed at this temperature for 8 hours. The reaction product became a faintly-yellow liquid in the system. As a result of measuring the characteristic absorption of the reaction product by an infrared spectrum, an absorption at 2270 $cm^{-1}$, which is characteristic absorption of an isocyanate group, completely disappeared, and absorption of an imide group was observed at 1780 $cm^{-1}$ and 1720 $cm^{-1}$. The acid value of the reaction product was 185 KOHmg/g based on solid content. In the molecular weight of the reaction product, the number average molecular weight thereof was 5700 based on polystyrene. The concentration of an acid anhydride group was 0.57 mmol/g based on solid content. The concentration of resin content was 50.2 mass %. The solution of this resin is abbreviated as a solution of comparative polyamide-imide resin (a2).

Examples 1 to 4, Comparative Examples 1 and 2

Curable resin compositions 1 to 6 were prepared under the combination conditions described in Table 1 using the above obtained alcohol-modified polyamide-imide resins (A2-1), (A2-2), (A2-3), and (A2-4) and comparative polyamide-imide resins (a1) and (a2).

TABLE 1

|  | Example | | | | Comparative Example | |
| --- | --- | --- | --- | --- | --- | --- |
|  | 1 | 2 | 3 | 4 | 1 | 2 |
| Curable resin composition | (1) | (2) | (3) | (4) | (5) | (6) |
| Solution of alcohol-modified polyamide-imide resin (A2-1) | 100 | | | | | |
| Solution of alcohol-modified polyamide-imide resin (A2-2) | | 100 | | | | |
| Solution of alcohol-modified polyamide-imide resin (A2-3) | | | 100 | | | |
| Solution of alcohol-modified polyamide-imide resin (A2-4) | | | | 100 | | |
| Solution of comparative polyamide-imide resin (a1) | | | | | 100 | |
| Solution of comparative polyamide-imide resin (a2) | | | | | | 100 |
| Epoxy resin (B) | | | | | | |
| ① EHPE3150 | 23.0 | | | 24.7 | 31.7 | 29.3 |
| ② EPICLON N-680 | | | 27.4 | | | |
| ③ DENACOL EX-252 | | 15.1 | | | | |

Footnotes of Table 1

EHPE3150: cyclic aliphatic epoxy resin (1,2-epoxy-4-(2-oxiranyl) cyclohexane adduct of 2,2-bis(hydroxymethyl)-1-butanol)) manufactured by Daicel Corporation, epoxy equivalent: 177, and concentration of resin content: 100 mass %.

EPICLON N-680: cresol novolac type epoxy resin, manufactured by DIC Corporation, epoxy equivalent: 211, and concentration of resin content: 100 mass %.

DENACOL EX-252: cyclic aliphatic epoxy resin (hydrogenated bisphenol A type epoxy resin) manufactured by Nagase ChemteX Corporation, epoxy equivalent: 212, and concentration of resin content: 100 mass %.

<Measurement of Storage Stability>

Each of the curable resin compositions 1 to 6 was heated to 160° C. on a hot plate, and the time taken until the cobwebbing of each of the curable resin compositions 1 to 6 disappears was measured. The obtained results are shown as "160° C. gel time" in Table 2.

<Method of Evaluating Tg of Film>

Fabrication of Test Piece for Measuring

Each of the curable resin compositions 1 to 6 was applied onto a flexible substrate such that the film thickness after curing is 25 to 35 microns. Subsequently, the coated substrate was dried at 50° C. for 30 minutes by a dryer and then further dried at 100° C. for 30 minutes, finally followed by curing at 170° C. for 1 hour, so as to form a cured film. The cured film was cooled to room temperature, cut to a predetermined size, and then isolated from the substrate, so as to fabricate a sample for measuring.

Method of Measuring Tg of Film

Dynamic viscoelastictiy was measured, and the maximum temperature of Tan δ of the obtained spectrum was set to Tg. Here, dynamic viscoelastictiy was measured under the following conditions:

Measuring instrument: Reobaiburon RSA-II (manufactured by Rheometric Inc.)
Jig: tension
Distance between chucks: 20 mm
Measuring temperature: 25° C. to 400° C.
Measuring frequency: 1 HZ
Temperature increase rate: 3° C./min The obtained results are shown as "Tg (° C.) of film" in Table 2.

<Method of Measuring Decomposition Temperature of Laminate>

Finally, the non-volatile content (N. V.) of each of thermosetting resin compositions 1 to 6 was adjusted by adding methyl ethyl ketone such that the non-volatile content thereof is 58 mass %.

Then, a laminate was fabricated under the following conditions, and the laminate was evaluated by the following method.

Laminate Fabrication Conditions
Base material: GLASSCLOTH "#2116" (210×280 mm) manufactured by Nitto Boseki Co., Ltd.
Number of fabrics: 6
Prepreg condition: 160° C.
Curing conditions: 1.5 hours at 200° C., 40 kg/cm²
Plate thickness after molding: 0.8 mm Method of Measuring Decomposition Temperature of Laminate The thermal decomposition temperature of the laminate was measured using a thermal mass measuring device. The temperature at which mass was reduced by 5 mass % with respect to the mass before increasing temperature was set to thermal decomposition temperature (° C.).

Measuring instrument: METTLER TGA/DSC1 (manufactured by Mettler-Toledo International Inc.)
Measuring temperature: 25° C. to 600° C.
Temperature increase rate: 10° C./min
Measuring atmosphere: nitrogen
Sample pan: SII aluminum The obtained results are shown as "decomposition temperature (° C.) of laminate" in Table 2.

<Evaluation of Light Transmittance of Film>

Fabrication of Test Piece for Measuring

Each of the curable resin compositions 1 to 6 was applied onto a flexible substrate such that the film thickness after curing is 25 to 35 microns. Subsequently, the coated substrate was dried at 50° C. for 30 minutes by a dryer and then further dried at 100° C. for 30 minutes, finally followed by curing at 170° C. for 1 hour, so as to form a cured film. The cured film was cooled to room temperature, cut to a predetermined size, and then isolated from the substrate, so as to fabricate a sample for measuring.

Method of Measuring Light Transmittance of Film

The light transmittance of a film was measured under the following conditions. The measured value is light transmittance (%).

Measuring instrument: Spectrophotometer U-2800 (manufactured by Hitachi High-Technologies Corporation)

Measuring wavelength range: 250 nm to 800 nm

The obtained results are shown in Table 3.

TABLE 2

|  | Example | | | | Comparative Example | |
|---|---|---|---|---|---|---|
|  | 1 | 2 | 3 | 4 | 1 | 2 |
| Curable resin composition | (1) | (2) | (3) | (4) | (5) | (6) |
| 160° C. gel time | 8' 42" | 12' 12" | 7' 51" | 2' 23" | 5' 40" | 1' 52" |
| Tg (° C.) of film | 277 | 214 | 258 | 291 | 292 | 307 |
| Decomposition temperature (° C.) of laminate | 382 | 378 | 392 | 370 | 379 | 370 |

In the table, "'" represents minute, and "''" represents second.

TABLE 3

|  |  | Example | | | | Comparative Example | |
|---|---|---|---|---|---|---|---|
|  |  | 1 | 2 | 3 | 4 | 1 | 2 |
| Curable resin composition |  | (1) | (2) | (3) | (4) | (5) | (6) |
| Wavelength | 400 [nm] | 89 | 85 | 85 | 85 | 89 | 84 |
|  | 500 [nm] | 90 | 89 | 89 | 89 | 90 | 88 |
|  | 600 [nm] | 91 | 89 | 89 | 90 | 91 | 88 |
|  | 700 [nm] | 91 | 89 | 90 | 90 | 91 | 89 |

It was clearly found that the curable resin composition of Example 1, which was obtained by using the alcohol-modified polyamide-imide resin synthesized using tricarboxylic anhydride having an aliphatic structure as a raw material, has long gel time at 160° C. and improved storage stability, compared to the curable resin composition of Comparative Example 1, which was obtained in the same manner except that alcohol modification was not carried out. Further, it was clearly found that each of the curable resin compositions of Examples 2 and 3, which were obtained by using the alcohol-modified polyamide-imide resin synthesized using tricarboxylic anhydride having an aliphatic structure, also has long gel time at 160° C. and excellent storage stability.

Meanwhile, it was clearly found that the curable resin composition of Example 4, which was obtained by using the alcohol-modified polyamide-imide resin synthesized using tricarboxylic anhydride having an aromatic structure as a raw material, also has long gel time at 160° C. and improved storage stability, compared to the curable resin composition of Comparative Example 2, which was obtained in the same manner except that alcohol modification was not carried out.

All of the films formed using the curable resin compositions of Examples 1 to 4 have Tg of 200° C. or higher, and, have had heat resistance suitable for recent high heat-resistant electronic materials.

All of the laminates formed using the curable resin compositions of Examples 1 to 4 have high thermal decomposition temperature resistance, suppress the decomposition of alcohol-modified sites and the elimination of alcohol, and have sufficient thermal decomposition resistance for applications in the field of electronic materials. Meanwhile, at the time of fabricating the laminate, although the laminate of Example 4 has no problem in practical use, irregularities caused by the non-volatility of a solvent and the insufficient melting of a resin were observed on a part of the laminate because the solvent was sufficiently dried. Moreover, in the case of the laminate of Comparative Example 2, due to the sufficient drying of a solvent, irregularities caused by the non-volatility of a solvent and the insufficient melting of a resin were observed on a part of the laminate, and the laminate was stripped, and thus this laminate was not suitable for practical use.

All of the films formed using the curable resin compositions of Examples 1 to 4 have high light transmittance in the visible range.

From the above results, according to the curable resin compositions of Examples 1 to 4 and cured products thereof, the heat resistance (high Tg) and transparency of the cured products are maintained, and simultaneously the storage stability of the curable resin compositions is excellent and the usable life thereof is long. This tendency is particularly applied to the curable resin compositions of Examples 1 to 3, which were obtained by using the alcohol-modified polyamide-imide resin synthesized using tricarboxylic anhydride having an aliphatic structure.

The invention claimed is:

1. An alcohol-modified polyamide-imide resin, which is obtained by reacting an isocyanurate type polyisocyanate (a1) synthesized from an isocyanate having an aliphatic structure with a tricarboxylic anhydride (a2) to prepare a polyamide-imide resin (A1), and then reacting the polyamide-imide resin (A1) with an alcohol compound (a3);
wherein, in the reaction of the polyamide-imide resin (A1) with the alcohol compound (a3), the ratio L/M3 of the mole number (M3) of acid anhydride groups in the polyamide-imide resin (A1) to the mole number (L) of hydroxyl groups in the alcohol compound (a3) is in a range of 1 to 5;
wherein the tricarboxylic anhydride (a2) is a tricarboxylic anhydride having an aliphatic structure.

2. The alcohol-modified polyamide-imide resin according to claim 1, which is obtained by reacting an isocyanurate type polyisocyanate (a1) synthesized from an isocyanate having an aliphatic structure with a tricarboxylic anhydride (a2) to prepare a polyamide-imide resin (A1) in which an absorption at 2270 cm$^{-1}$, which is characteristic absorption of an isocyanate group in an infrared absorption spectrum, disappears, and then reacting the polyamide-imide resin (A1) with an alcohol compound (a3).

3. The alcohol-modified polyamide-imide resin according to claim 1, wherein the ratio [((M1)+(M2))/(N)] of sum of the mole number (M1) of carboxyl groups and the mole number (M2) of acid anhydride groups of the tricarboxylic anhydride (a2) to the mole number (N) of isocyanate groups of the isocyanurate type polyisocyanate (a1) synthesized from an isocyanate having the aliphatic structure is 1.1 to 3.

4. The alcohol-modified polyamide-imide resin according to claim 1, wherein an isocyanurate type polyisocyanate compound (a1) is an isocyanurate type polyisocyante synthesized from an isocyanate having a cyclic aliphatic structure, and the tricarboxylic anhydride (a2) having an aliphatic structure is a tricarboxylic anhydride having a cyclic aliphatic structure.

5. The alcohol-modified polyamide-imide resin according to claim 4, wherein the isocyanurate type polyisocyanate compound having a cyclic aliphatic structure is an isocyanurate type polyisocyanate synthesized from isophorone diisocyanate, and the tricarboxylic anhydride having a cyclic aliphatic structure is cyclohexane-1,3,4-tricarboxylic acid-3,4-anhydride.

6. The alcohol-modified polyamide-imide resin according to claim 1, which has an acid value of from 70 to 210 KOHmg/g.

7. The alcohol-modified polyamide-imide resin according to claim 1, which dissolves in a polar solvent that does not contain any of a nitrogen atom and a sulfur atom.

8. A curable resin composition, comprising:
the alcohol-modified polyamide-imide resin according to claim 1; and
a curable resin (B) and/or a reactive diluent (C).

9. The curable resin composition according to claim 8, further comprising a photopolymerization initiator (D).

10. The curable resin composition according to claim 8, wherein the curable resin (B) is an epoxy compound (B1) having two or more epoxy groups in a molecule thereof.

11. A cured product, which is prepared by curing the curable resin composition according to claim 8.

12. The alcohol-modified polyamide-imide resin according to claim 2, wherein the ratio [((M1)+(M2))/(N)] of sum of the mole number (M1) of carboxyl groups and the mole number (M2) of acid anhydride groups of the tricarboxylic anhydride (a2) to the mole number (N) of isocyanate groups of the isocyanurate type polyisocyanate (a1) synthesized from an isocyanate having the aliphatic structure is 1.1 to 3.

13. The alcohol-modified polyamide-imide resin according to claim 2, wherein an isocyanurate type polyisocyanate compound (a1) is an isocyanurate type polyisocyante synthesized from an isocyanate having a cyclic aliphatic structure, and the tricarboxylic anhydride (a2) having an aliphatic structure is a tricarboxylic anhydride having a cyclic aliphatic structure.

14. The alcohol-modified polyamide-imide resin according to claim 2, which has an acid value of from 70 to 210 KOHmg/g.

15. The alcohol-modified polyamide-imide resin according to claim 2, which dissolves in a polar solvent that does not contain any of a nitrogen atom and a sulfur atom.

16. A curable resin composition, comprising:
the alcohol-modified polyamide-imide resin according to claim 2; and
a curable resin (B) and/or a reactive diluent (C).

17. The alcohol-modified polyamide-imide resin according to claim 1, wherein the alcohol compound (a3) is one or more types selected from n-propyl alcohol, isopropyl alcohol, n- butyl alcohol, isobutyl alcohol, and t-butyl alcohol.

18. The alcohol-modified polyamide-imide resin according to claim 1, wherein, the ratio L/M3 is in a range of 1 to 3.

19. The alcohol-modified polyamide-imide resin according to claim 1, wherein, the ratio L/M3 is in a range of 1 to 2.

* * * * *